May 13, 1958  H. A. STUART  2,834,434
DUAL BRAKE APPLICATOR
Filed Dec. 31, 1953
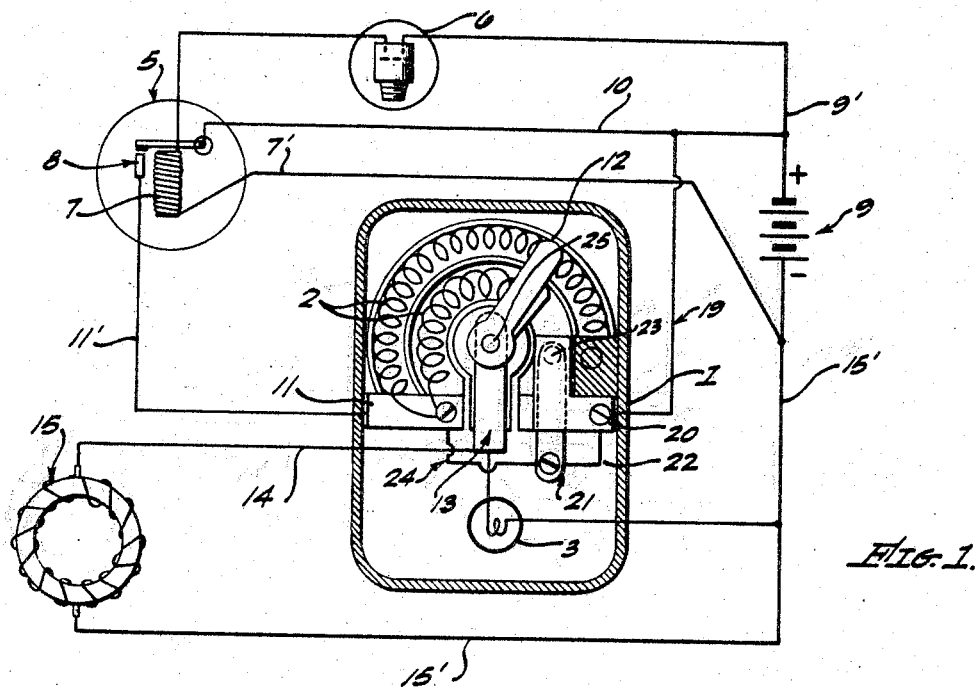
*FIG. 1.*
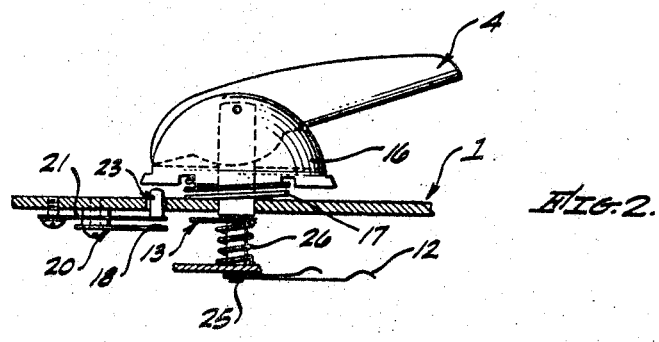
*FIG. 3.*   *FIG. 2.*
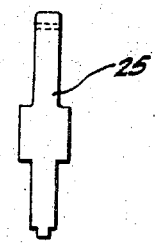
*FIG. 4.*
INVENTOR.
HARRY A. STUART,
BY
ATTORNEY.

United States Patent Office 2,834,434
Patented May 13, 1958

2,834,434

DUAL BRAKE APPLICATOR

Harry A. Stuart, Long Beach, Calif.

Application December 31, 1953, Serial No. 401,519

4 Claims. (Cl. 188—3)

This invention relates to a dual brake applicator, that is, an applicator for trailer brakes, and particularly for electrically actuated trailer brakes of the type commonly used on house trailers.

An object of my novel dual brake applicator is to provide an electrical brake control, in which the current can be controlled by either the foot brake or through a manually operable lever available to the driver.

Another object of my invention is to provide a novel dual brake applicator in which the current to the house trailer brakes can be varied through a manually adjustable rheostat.

Still another object is to provide a novel brake applicator in which electrical contacts are caused to be closed when the main vehicle brake is applied, and these contacts are so arranged that current passes through a manually adjustable rheostat to the trailer brakes.

Another object of my invention is to provide a novel dual brake applicator in which a hydraulically actuated switch is mounted in the hydraulic brake line of the pulling vehicle, and this switch closes contacts to direct current from the battery to a manually adjustable rheostat and thence to the trailer brakes.

A feature of my invention is to provide a pilot light in the dual brake applicator which is visible to the driver, and thus gives the driver a visual means of determining the brake setting by observing the brightness of that light.

Other objects, advantages and features of invention may appear from the accompanying drawing, the subjoined detailed description and the appended claims.

In the drawing—

Figure 1 is a diagrammatic bottom plan view of my dual brake applicator illustrating the wiring arrangement.

Figure 2 is a fragmentary vertical sectional view of the rheostat load selector and manual control handle.

Figure 3 is a side view of the pin upon which the handle is mounted.

Figure 4 is a top plan view of the same.

Referring more particularly to the drawing, my dual brake applicator consists of a case or housing 1 in which is mounted the rheostat windings 2, the pilot light 3, the load selector knob 4, the solenoid relay 5 and the hydraulic switch 6. It will be noted that the rheostat windings 2 are arranged in an arc so that these windings may be contacted on rotation of the handle 4, as will be further described. It may be further noted that the hydraulic switch 6 is one usual and well known in the art and is merely a pressure switch which is actuated by hydraulic pressure in the brake system of the pulling vehicle. The hydraulic switch, therefore, is tapped into the hydraulic brake line of the pulling vehicle and the pressure diaphragm therein actuates the solenoid relay 5, as will be further described. Current is caused to flow whenever the brake pedal of the towing vehicle is pressed, thereby causing the hydraulic switch 6 to close its points and thus energize the solenoid 7 of the relay 5. When the solenoid 7 is thus energized, the contact points 8 will be closed. Current from the battery 9 can now flow through the lead 9' (called the hot lead) to the hydraulic switch 6 and thence to the solenoid 7. With the contacts 8 closed current is fed to the bus bar 11 through the lead 11'. Current then flows through the rheostat windings 2 and thence through the wiper contacts 12 to the contact bar 13, thence through the lead 14 to the brake solenoid 15. This brake solenoid is usual and well known and is now commonly used to actuate the electric brakes of vehicles. From the brake solenoid 15 the current flows either to ground or to a ground lead 15'. The solenoid 7 is also grounded, or it may have a ground lead 7' which is connected to the ground lead 15'.

In order that the operator may be provided with a manual control, and still using only one rheostat for both the manual control as well as the brake pedal control, I provide the following construction: A control knob 16 is mounted on the housing 1 and the control handle 4 is mounted in this selector knob. A spring 17 is mounted under the selector knob 16 and bears against the top of the housing 1, thus pushing the selector knob upwardly to a released position, as will be further described. Within the housing 1, and below the selector knob 16, I provide the contact points 18. A lead 19 extends from the wire 10 to a contact bar 20 within the housing 1. A second contact bar 21 is connected to the contact bar 20 by a short lead 22. The contacts 20—21 overlie each other, as is better shown in Figure 2. The contacts 20—21 are also insulated from each other. A pin 23 rises from the contact 21 and extends through the wall of the housing 1. This pin is positioned under the periphery of the selector knob 16 and when the selector knob is pushed downwardly the contacts 18 may be closed. The contact 21 is connected to the contact bar 11 by a short lead 24. Whenever the handle 4 is pressed downwardly it will cam the selector knob 16 downwardly, thus engaging the pin 23 and pressing this pin downwardly to close the contacts 18. This causes current to flow from the lead 19 through the contacts 22 and 21, thence through the resistance windings 2 through the wiper contacts 12, thence through the mounting pin 25 and contact plate 13 out through the lead 14 to the brake solenoid 15. The mounting pin 25 is journaled in the top of the housing 1 and the hand control 4 is pivotally secured to this pin.

The tension spring 26 presses upwardly against the contacts 13 and thus maintains electrical contact between the pin and the bar. Whenever the handle 4 is released the spring 17 will move the selector knob 16 upwardly, thus releasing pressure on the pin 23, thus opening the contact points 18. This breaks the electrical connection and releases the brakes. The pilot light 3 is energized whenever current is caused to flow through the contact 13 by either the foot pedal or manual controls. This pilot light is grounded to the ground wire 15' or to the housing 1 and is also connected by lead to the contact 13, as shown.

In operation—considering first the foot pedal control: Whenever the brake pedal is depressed, the hydraulic switch 6 closes its contact point since it is mounted in the hydraulic brake line. This energizes the solenoid 7, causing the points 8 to be closed. Current from the battery 9 now flows through the lead 10, through the contacts 8 to the contact bar 11, thence through the resistance windings 2, through the wiper contacts 12, then to the contact bar 13 through the lead 14 to the brake solenoid 15. The amount of resistance in the windings 2 can be adjusted by rotating the selector knob 4.

If it is desired to manually actuate the brake solenoid 15 it is only necessary to depress the handle 4. This pushes the selector knob 16 downwardly to engage and depress the pin 23. By this means the contacts 18 are closed. Current now flows from the lead 19, through the contacts 21—22, thence through the resistance windings 2 and through the wiper contacts 12, then through the pivot pin 25, then to contact 13 and out through the lead 14 to the brake solenoid 15.

Having described my invention, I claim:

1. A brake applicator for electrical trailer brakes including a brake solenoid on the trailer, said brake applicator including the combination with the hydraulic brake lines of a pulling vehicle and a manually operable rheostat, a hydraulically actuated electric switch mounted in the hydraulic brake line of the pulling vehicle, a relay including contact points, a battery, said relay contact points being electrically connected to the battery, an electrical lead extending from the battery to the hydraulically actuated switch and thence to the rheostat, a second lead extending from the rheostat to the brake solenoid, another lead extending from the rheostat to the battery, and still another lead extending from the brake solenoid to the battery, a manually operable switch means electrically connected to the rheostat and to the battery to by-pass the hydraulically actuated switch.

2. A brake applicator for electrical trailer brakes including a brake solenoid on the trailer, said brake applicator including the combination with the hydraulic brake lines of a pulling vehicle and a manually operable rheostat, a hydraulically actuated electric switch mounted in the hydraulic brake line of the pulling vehicle, a relay including contact points, a battery, said relay contact points being electrically connected to the battery, an electric lead extending from the battery to the hydraulically actuated switch and thence to said relay to actuate said relay, a lead extending from a relay contact point to the rheostat, a second lead extending from the rheostat to the brake solenoid and another lead extending from the rheostat to the battery.

3. A brake applicator for electrical trailer brakes including a brake solenoid on the trailer, said brake applicator including the combination with the hydraulic brake lines of a pulling vehicle and a manually operable rheostat, a hydraulically actuated electric switch mounted in the hydraulic brake line of the pulling vehicle, a relay including contact points, a battery, said relay contact points being electrically connected to the battery, an electric lead extending from the battery to the hydraulically actuated switch and thence to said relay to actuate said relay, a lead extending from a relay contact point to the rheostat, a second lead extending from the rheostat to the brake solenoid and another lead extending from the rheostat to the battery, and a manually operable switch means electrically connected to the rheostat and to the battery to by-pass the hydraulically actuated switch.

4. A brake applicator for electrical trailer brakes including a brake solenoid on the trailer, said brake applicator including the combination with the hydraulic brake lines of a pulling vehicle and a manually operable variable rheostat including arcuate windings, a central pin and wiper contacts on the pin engaging said windings, a control knob mounted on said pin, a handle pivotally mounted on the pin and engaging the control knob, said control knob being movable on the pin on pivotal movement of the handle, a hydraulically actuated electric switch mounted in the hydraulic brake line of the pulling vehicle, a relay including contact points, a battery, said relay contact points being electrically connected to the battery, an electric lead extending from the battery to the hydraulically actuated switch and thence to the rheostat, a second lead extending from the rheostat to the brake solenoid, another lead extending from the rheostat to the battery, and still another lead extending from the brake solenoid to the battery, switch means adjacent the selector knob and engageable by the knob on pivotal movement of that handle, said switch means being electrically connected to the rheostat and to the battery to by-pass the hydraulically actuated switch.

References Cited in the file of this patent
UNITED STATES PATENTS

| | | |
|---|---|---|
| 2,216,054 | Stearns | Sept. 24, 1940 |
| 2,260,641 | Reid | Oct. 28, 1941 |
| 2,349,167 | Gunderson | May 16, 1944 |
| 2,380,765 | Keith | July 31, 1945 |
| 2,436,102 | Douglas | Feb. 17, 1948 |
| 2,550,068 | Hudson | Apr. 24, 1951 |
| 2,693,251 | Hall | Nov. 2, 1954 |